June 1, 1954      R. J. CAPUANO      2,680,169

LIQUID LEVEL INDICATOR SWITCH

Filed Aug. 7, 1952

Ralph James Capuano
INVENTOR.

BY *Clarence A. O'Brien*
and *Harvey B. Jacobson*
Attorneys

Patented June 1, 1954

2,680,169

UNITED STATES PATENT OFFICE 2,680,169

LIQUID LEVEL INDICATOR SWITCH

Ralph James Capuano, Guilford, Conn.

Application August 7, 1952, Serial No. 303,128

2 Claims. (Cl. 200—84)

This invention relates to liquid level indicators in general, and more specifically to a liquid level indicator for use with a hydraulic fluid supply for a vehicle hydraulic brake system.

The primary object of this invention is to provide an improved liquid level indicator for indicating the level of a hydraulic brake fluid supply whereby an operator of a vehicle provided with the same will be warned of the drop in level of the hydraulic brake fluid supply prior to the actual exhaustion of the same.

Another object of this invention is to provide an improved reservoir system for master brake cylinders of hydraulic brake systems, said reservoir system including an adjoining reservoir carried by a vehicle above and spaced from the reservoir integral with a master brake cylinder, said additional reservoir being conveniently positioned whereby it may be readily filled with hydraulic brake fluid.

Another object of this invention is to provide an improved hydraulic brake fluid supply system wherein an operator of a vehicle will be warned of the reduction in the volume of hydraulic brake fluid before the reservoir normally formed integral with the master brake cylinder has reached a partially filled stage.

A further object of this invention is to provide an improved liquid level indicator which includes a fixed contact which may be vertically adjusted in order to vary the level at which a warning light is lit.

A still further object of this invention is to provide an improved switch construction which may be removably disposed within a reservoir and connected to an electrical warning system whereby a warning signal will be operated upon the reaching of the level of the liquid within the reservoir to a predetermined lower level.

Figure 1:
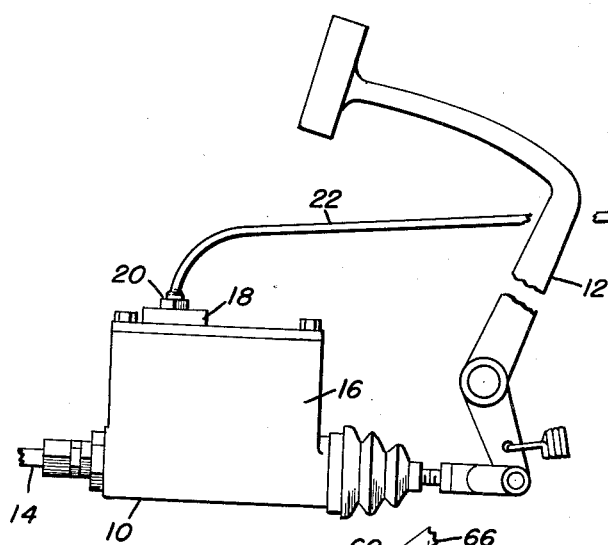
Figure 2:
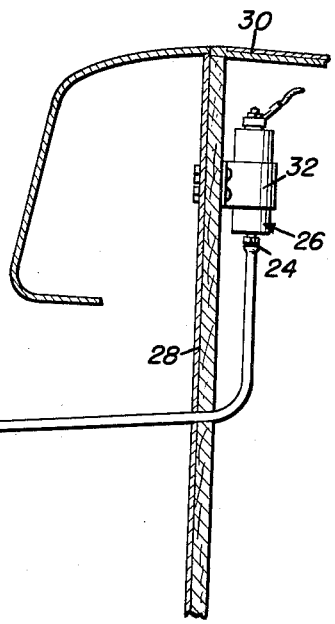
Figure 2:
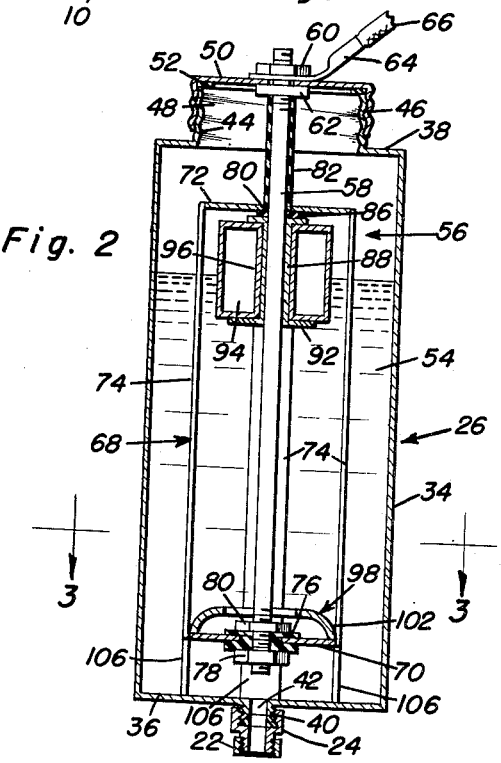
Figure 3:
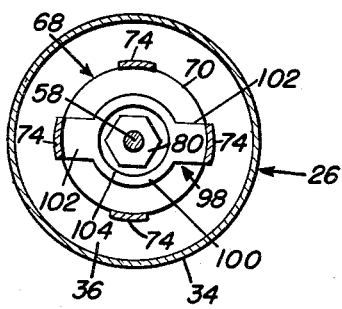

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 1 is a fragmentary side elevational view of a portion of a conventional vehicle and includes a hydraulic master brake cylinder, foot pedal means for operating the same, a portion of the hood and fire wall of the vehicle, and the improved reservoir system which is subject to this invention;

Figure 2 is an enlarged transverse vertical sectional view taken through the central portion of the reservoir attached to the far wall of Figure 1 and showing the construction of the switch mechanism disposed therein for indicating the level of the liquid within the reservoir; and, Figure 3 is a transverse vertical sectional view taken substantially upon the plane indicated by the section line 3—3 of Figure 2 and showing the general arrangement of a lower contact and a cage in which it is mounted for vertical movement.

Similar characters of reference designate similar or identical elements and portions throughout the specification and throughout the different views of the drawings.

Referring now to the drawings in detail, it is seen that there is illustrated in Figure 1 a master brake cylinder 10 of a hydraulic brake system which operated by a foot pedal assembly 12 to selectively pump hydraulic fluid under pressure through brake lines 14 extending from the rear end thereof. Integral with the master brake cylinder 10 and occupying the upper portion is a hydraulic brake fluid reservoir 16 which is provided with a filler opening 18 on the opposite side thereof. Threadedly disposed in the filler opening 18 is a special fitting 20 which is connected to the lower rear end of the sectional tubing 22 whose upper front end is connected by a fitting 24 to an auxiliary reservoir 26. The auxiliary reservoir 26 is secured to the forward side of a fire wall 28 of a conventional vehicle and mounted under the hood 30 thereof whereby it is readily accessible. The auxiliary reservoir 26 is secured to the fire wall 28 by a suitable U-shaped clamp 32.

Referring now to Figure 2 in particular, it will be seen that the reservoir 26 is in the form of a vertically extending cylindrical housing having a cylindrical body portion 34 enclosed by circular bottom and cap members 36 and 38, respectively. The bottom cap member 36 is provided with a centrally located downwardly projecting externally threaded boss 40 which is threadedly connected to the fitting 24 of the tubing 22. The boss 40 is provided with a smooth concentric bore 42 which communicates the interior of the auxiliary reservoir 26 with the interior of the tubing 22. The top cap 38 includes a neck portion 44 of reduced diameter and is formed with external threads 46.

The interior of the neck portion 44 forms a filler opening 48 which is closed by a removable top 50 which is threadedly engaged with the threads 46 of the neck portion 44. The top 50 is sealed to the neck portion 44 by an annular gasket 52 disposed between the top portion 50 and the upper edge of the neck portion 44. By removing the top 50, the auxiliary reservoir 26 may be readily filled when the hood 30 of the vehicle is open and, inasmuch as the reservoir 26 is communicative with the reservoir 16 of the master brake cylinder, the reservoir 16 remains filled as long as the auxiliary reservoir 26 contains hydraulic brake fluid 54.

In order that the operator of the vehicle to which the auxiliary reservoir 26 is mounted may be immediately warned upon the dropping of the level of the brake fluid 54 therein past a predetermined point, the auxiliary reservoir 26 is provided with a switch mechanism which is referred to in general by the reference numeral 56. The switch mechanism 56 includes a vertically extending conductor 58 in the form of an elongated bolt threaded on both ends thereof. The conductor 58 depends from the top 50 and is clamped thereto by a nut 60 threadedly engaged on the upper end thereof and cooperating with a shoulder member 62 also threadedly engaged on the upper end thereof but positioned below the main portion of the top 50. The nut 60 also clamps a terminal 64 of a wire 66 to the upper end of the conductor 58.

Carried by the conductor 58 is a vertically extending cage, which is referred to in general by the reference numeral 68, the cage 68 including a base member 70 and a top member 72 connected together by a plurality of spaced vertically extending straps 74. The base 70 is provided with an insulating bushing 76 through which extends a lower portion of the conductor 58, the insulating bushing 76 resting upon a nut 78 threadedly engaged on the lower end of the conductor 58. The base 70 is further positioned with respect to the lower end of the conductor 58 by a second nut 80 threadedly engaged on the lower end thereof and overlying the insulating bushing 76 to clamp the same against the upper surface of the lower nut 78.

Carried by the upper portion of the conductor 58 and abutting the underside of the shoulder member 62 is an elongated sleeve 82 of insulation material which extends through a centrally located bore 84 in the top 72 of the cage 68 and insulates the same from the conductor 58. The elongated sleeve 82 is also provided with an annular flange 86 which projects outwardly at the lower end thereof and underlies the top 72.

Mounted on the conductor 58 for sliding movement longitudinally thereof is an elongated sleeve member 88 having outwardly projecting upper and lower annular flanges 90 and 92, respectively, in spaced parallel relation. Mounted between the annular flanges 90 and 92 is a vertically extending torus shaped float 94 which has a hollow interior. The float 94 has an inner wall 96 which engages the elongated sleeve 88 and prevents transverse movement thereof. The float 94 and its associated elongated sleeve 88 are free to slide vertically along the conductor 58 in response to the variation of the level of the hydraulic fluid 54 disposed within the auxiliary reservoir 26. Upper movement of the float 94 is limited by engagement of the upper annular flange 90 of the sleeve 88 with the annular flange 86 of the sleeve of insulation material 82. It will be noted that the float 94 is of such diameter whereby it is isolated from the cage 68 in which it is disposed for vertical movement along the conductor 58.

Carried by the cage 68 is an adjustable contact 98 which includes a circular body portion 100 and a pair of outwardly directed downwardly curved spring fingers 102 projecting therefrom in diametric opposite directions. The spring fingers 102 are adapted to engage the inner surfaces of a pair of diametrically opposed straps 74 and retain the adjustable contact 98 in an adjusted position within the cage 68. The circular body portion 100 surrounds the conductor 58 and includes an enlarged concentric opening 104 providing clearance for the same.

Inasmuch as the float 94 and its associated elongated sleeve 88 are mounted on the conductor 58, they may form a desirable movable contact which is actuated by the rise and fall of the level of the hydraulic fluid 54 within the auxiliary reservoir 26. As the reservoir 26 continues to supply hydraulic brake fluid lost by the master brake cylinder 10, the level of the hydraulic fluid 54 therein drops with the result that the sleeve 88 and the float 94 move downwardly. When the level of the hydraulic fluid 54 has dropped to a point adjacent the bottom of the auxiliary reservoir 26, the lower annular flange 92 of the sleeve 88 engages the upper surface of the circular body portion 100 with the result that a circuit is completed from the wire 66 to the body portion of the auxiliary reservoir 26, the reservoir being connected to the cage 68 by projecting members 106.

It will be understood that the auxiliary reservoir 26 being connected to the fire wall 28 and formed of metal is a ground and therefore may be utilized as a part of an electrical circuit of the vehicle which is mounted. The wire 66 will be connected to an indicating light which will be lit upon the completion of a circuit through the auxiliary reservoir 26 so as to indicate a reduction in the level of the hydraulic fluid 54 disposed therein.

Inasmuch as it may be desirable for the operator of the vehicle in which the auxiliary reservoir 26 is mounted to be warned prior to the level of the hydraulic fluid 54 reaching a point adjacent the bottom thereof, it will be understood that the movable contact 98 may be moved to a point vertically above that illustrated in Figure 2. The movable contact 98 is retained in its vertically adjusted position by the engagement of the spring fingers 102 with the straps 74.

The operation of this device will be understood from the foregoing description of the details thereof, taken in connection with the above recited objects and the drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A liquid level indicator switch for a hydraulic brake system comprising a brake fluid reservoir having a vertically extending conductor disposed therein and normally insulated therefrom, a first contact surrounding said conductor and electrically connected to said reservoir, a second contact slidably mounted on said conductor adapted to engage said first contact for completing an electrical circuit between said conductor and said reservoir, said first and second contacts being disposed in a cage carried by said conductor and insulated therefrom, said cage including a plurality of vertically extending straps connecting together upper and lower end plates thereof, said first contact having spring fingers engaging the inner faces of said straps and maintaining said first contact in position relative to said cage and said conductor.

2. A liquid level indicator switch for a hydraulic brake system comprising a brake fluid reservoir having a vertically extending conductor disposed therein and normally insulated therefrom, a first contact surrounding said conductor and electrically connected to said reservoir, a second contact slidably mounted on said conductor adapted to engage said first contact for completing an electrical circuit between said conductor and said reservoir, said first and second contacts being disposed in a cage carried by said conductor and insulated therefrom, said cage including a plurality of vertically extending straps connecting together upper and lower end plates thereof, said first contact having spring fingers engaging the inner faces of said straps and maintaining said first contact in position, said first contact being vertically positionable within said cage.

References Cited in the file of this patent

UNITED STATES PATENTS

| Number | Name | Date |
|---|---|---|
| 1,222,183 | Cohen | Apr. 10, 1917 |
| 1,348,015 | Lee | July 27, 1920 |
| 2,085,173 | Stansbury | June 29, 1937 |
| 2,161,441 | Vickers | June 6, 1939 |
| 2,615,105 | Whitney | Oct. 21, 1952 |

FOREIGN PATENTS

| Number | Country | Date |
|---|---|---|
| 66,181 | Switzerland | Oct. 22, 1913 |